United States Patent
Lee et al.

(10) Patent No.: US 10,935,823 B2
(45) Date of Patent: Mar. 2, 2021

(54) SHORT-CIRCUIT DETECTION CIRCUIT AND DISPLAY DEVICE INCLUDING THE SAME

(71) Applicant: Samsung Display Co., Ltd., Yongin-si (KR)

(72) Inventors: Dae-Sik Lee, Hwaseong-si (KR); Yanguk Nam, Hwaseong-si (KR); Sanghyun Lee, Seongnam-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 75 days.

(21) Appl. No.: 16/260,936

(22) Filed: Jan. 29, 2019

(65) Prior Publication Data

US 2019/0278114 A1    Sep. 12, 2019

(30) Foreign Application Priority Data

Mar. 6, 2018 (KR) .................... 10-2018-0026544

(51) Int. Cl.
| | |
|---|---|
| *G02F 1/13* | (2006.01) |
| *G09G 3/3266* | (2016.01) |
| *G09G 3/00* | (2006.01) |
| *G02F 1/1345* | (2006.01) |
| *G09G 3/36* | (2006.01) |

(52) U.S. Cl.
CPC ........ *G02F 1/1309* (2013.01); *G02F 1/13452* (2013.01); *G09G 3/006* (2013.01); *G09G 3/3266* (2013.01); *G09G 3/3611* (2013.01); *G09G 2330/04* (2013.01); *G09G 2330/12* (2013.01)

(58) Field of Classification Search
CPC . G02F 1/1309; G02F 1/13452; G09G 3/3266; G09G 3/006; G09G 3/3611; G09G 2330/04; G09G 2330/12; G09G 3/3677
See application file for complete search history.

(56) References Cited

U.S. PATENT DOCUMENTS

| | | | |
|---|---|---|---|
| 2007/0080905 A1* | 4/2007 | Takahara | G09G 3/3258 345/76 |
| 2018/0108308 A1* | 4/2018 | Cao | G09G 3/36 |
| 2019/0081471 A1* | 3/2019 | Park | G09G 3/00 |

FOREIGN PATENT DOCUMENTS

| | | |
|---|---|---|
| KR | 10-2012-0055436 A | 5/2012 |
| KR | 10-2015-0081867 A | 7/2015 |
| KR | 10-2015-0086820 A | 7/2015 |
| KR | 10-2017-0122891 A | 11/2017 |

* cited by examiner

*Primary Examiner* — Akm Zakaria
(74) *Attorney, Agent, or Firm* — Lewis Roca Rothgerber Christie LLP

(57) ABSTRACT

A short-circuit detection circuit includes a voltage comparison block that receives a scan start signal from a scan start signal transmission line, receives a reference voltage from a reference voltage source, and outputs a comparison result by comparing the scan start signal with the reference voltage at a falling edge of a vertical start signal, and a short-circuit determination block that determines whether the scan start signal transmission line is short-circuited based on the comparison result and operates an over-current protection circuit by providing a short-circuit detection signal to the over-current protection circuit when the scan start signal transmission line is short-circuited.

20 Claims, 10 Drawing Sheets

SHORT-CIRCUIT DETECTION CIRCUIT AND DISPLAY DEVICE INCLUDING THE SAME

CROSS-REFERENCE TO RELATED APPLICATION

This application claims priority to and the benefit of Korean Patent Application No. 10-2018-0026544, filed on Mar. 6, 2018 in the Korean Intellectual Property Office (KIPO), the entire content of which is incorporated herein in its entirety by reference.

BACKGROUND

1. Field

Exemplary embodiments relate generally to a display device. For example, embodiments of the present disclosure relate to a short-circuit detection circuit capable of detecting a short-circuit in a display panel driving circuit and a display device including the short-circuit detection circuit.

2. Description of the Related Art

Generally, a display device includes a display panel that includes a plurality of pixel circuits, a scan driver that provides a scan signal to the pixel circuits, a data driver that provides a data signal to the pixel circuits, a timing controller that controls the scan driver and the data driver, etc. The scan driver includes a signal generating block and a shift register block. The scan driver sequentially applies the scan signal to scan-lines. For example, the signal generating block receives a vertical start signal and at least one vertical clock signal from the timing controller, generates a scan start signal by performing a level shifting on the vertical start signal, and generates at least one scan clock signal by performing a level shifting on the at least one vertical clock signal. The shift register block receives the scan start signal and the at least one scan clock signal from the signal generating block and generates the scan signal to be sequentially applied to the scan-lines based on the scan start signal and the at least one scan clock signal. However, when a scan start signal transmission line through which the scan start signal is transmitted is short-circuited with a transmission line through which a low power voltage or a high power voltage is transmitted in a display panel driving circuit, the scan start signal may be distorted, and thus a defect such as a light leakage phenomenon may occur at an upper region (e.g., an upper right region) of the display panel. In addition, when the display panel driving circuit and/or a power management integrated circuit continuously operates despite the presence of the short-circuit, serious product liability (PL) accidents due to malfunction of the display device (e.g., breakage, fire, etc.) may occur.

SUMMARY

Some exemplary embodiments provide a short-circuit detection circuit that detects whether a scan start signal transmission line is short-circuited in a display panel driving circuit and operates an over-current protection circuit when the scan start signal transmission line is short-circuited with a transmission line through which a high power voltage or a low power voltage is transmitted.

Some exemplary embodiments provide a display device (e.g., an organic light emitting display (OLED) device, a liquid crystal display (LCD) device, etc.) including the short-circuit detection circuit.

According to an aspect of exemplary embodiments, a short-circuit detection circuit may include a voltage comparison block configured to receive a scan start signal from a scan start signal transmission line, to receive a reference voltage from a reference voltage source, and to output a comparison result by comparing the scan start signal with the reference voltage at a falling edge of a vertical start signal, and a short-circuit determination block configured to determine whether the scan start signal transmission line is short-circuited based on the comparison result and to operate an over-current protection circuit by providing a short-circuit detection signal to the over-current protection circuit when the scan start signal transmission line is short-circuited.

In exemplary embodiments, the short-circuit determination block may determine that the scan start signal transmission line is short-circuited with a first transmission line through which a low power voltage is transmitted when the comparison result indicates that the scan start signal is less than the reference voltage at the falling edge of the vertical start signal.

In exemplary embodiments, the short-circuit determination block may determine that the scan start signal transmission line is not short-circuited with the first transmission line when the comparison result indicates that the scan start signal is not less than the reference voltage at the falling edge of the vertical start signal.

In exemplary embodiments, the short-circuit determination block may determine that the scan start signal transmission line is short-circuited with a second transmission line through which a high power voltage is transmitted when the comparison result indicates that the scan start signal is greater than the reference voltage at the falling edge of the vertical start signal.

In exemplary embodiments, the short-circuit determination block may determine that the scan start signal transmission line is not short-circuited with the second transmission line when the comparison result indicates that the scan start signal is not greater than the reference voltage at the falling edge of the vertical start signal.

In exemplary embodiments, the short-circuit determination block may determine that the scan start signal transmission line is short-circuited with a first transmission line through which a low power voltage is transmitted when the comparison result indicates that the scan start signal is less than the reference voltage by more than a first voltage difference at the falling edge of the vertical start signal.

In exemplary embodiments, the short-circuit determination block may determine that the scan start signal transmission line is not short-circuited with the first transmission line when the comparison result indicates that the scan start signal is not less than the reference voltage by more than the first voltage difference at the falling edge of the vertical start signal.

In exemplary embodiments, the short-circuit determination block may determine that the scan start signal transmission line is short-circuited with a second transmission line through which a high power voltage is transmitted when the comparison result indicates that the scan start signal is greater than the reference voltage by more than a second voltage difference at the falling edge of the vertical start signal.

In exemplary embodiments, the short-circuit determination block may determine that the scan start signal transmission line is not short-circuited with the second transmission line when the comparison result indicates that the scan start signal is not greater than the reference voltage by more than the second voltage difference at the falling edge of the vertical start signal.

According to another aspect of exemplary embodiments, a short-circuit detection circuit may include a current comparison block configured to sense a transmission line current flowing through a scan start signal transmission line through which a scan start signal is transmitted at a time point where a set (e.g., predetermined) time elapses from a rising edge of a vertical start signal and to output a comparison result by comparing the transmission line current with a reference current, and a short-circuit determination block configured to determine whether the scan start signal transmission line is short-circuited based on the comparison result and to operate an over-current protection circuit by providing a short-circuit detection signal to the over-current protection circuit when the scan start signal transmission line is short-circuited.

In exemplary embodiments, the short-circuit determination block may determine that the scan start signal transmission line is short-circuited with a first transmission line through which a low power voltage is transmitted or a second transmission line through which a high power voltage is transmitted when the comparison result indicates that a current difference between the transmission line current and the reference current is greater than a reference value.

In exemplary embodiments, the short-circuit determination block may determine that the scan start signal transmission line is not short-circuited with the first transmission line or the second transmission line when the comparison result indicates that the current difference between the transmission line current and the reference current is less than the reference value.

According to an aspect of exemplary embodiments, a display device may include a display panel including a plurality of pixel circuits, a display panel driving circuit configured to drive the display panel, a power management integrated circuit configured to supply power to the display panel and the display panel driving circuit, an over-current protection circuit configured to turn off at least one selected from the display panel driving circuit and the power management integrated circuit when a short-circuit is detected in the display panel driving circuit, and a short-circuit detection circuit configured to detect whether a scan start signal transmission line is short-circuited in the display panel driving circuit and to operate the over-current protection circuit when the scan start signal transmission line is short-circuited.

In exemplary embodiments, the display panel driving circuit may store a short-circuit occurrence record indicating that the scan start signal transmission line is short-circuited when the scan start signal transmission line is short-circuited.

In exemplary embodiments, at least one selected from the power management integrated circuit, the over-current protection circuit, and the short-circuit detection circuit may be implemented internally to the display panel driving circuit.

In exemplary embodiments, the short-circuit detection circuit may include a voltage comparison block configured to receive a scan start signal from the scan start signal transmission line, to receive a reference voltage from a reference voltage source, and to output a comparison result by comparing the scan start signal with the reference voltage at a falling edge of a vertical start signal, and a short-circuit determination block configured to determine whether the scan start signal transmission line is short-circuited based on the comparison result and to operate the over-current protection circuit by providing a short-circuit detection signal to the over-current protection circuit when the scan start signal transmission line is short-circuited.

In exemplary embodiments, the short-circuit determination block may determine that the scan start signal transmission line is short-circuited with a first transmission line through which a low power voltage is transmitted when the comparison result indicates that the scan start signal is less than the reference voltage at the falling edge of the vertical start signal.

In exemplary embodiments, the short-circuit determination block may determine that the scan start signal transmission line is not short-circuited with the first transmission line when the comparison result indicates that the scan start signal is not less than the reference voltage at the falling edge of the vertical start signal.

In exemplary embodiments, the short-circuit determination block may determine that the scan start signal transmission line is short-circuited with a second transmission line through which a high power voltage is transmitted when the comparison result indicates that the scan start signal is greater than the reference voltage at the falling edge of the vertical start signal.

In exemplary embodiments, the short-circuit determination block may determine that the scan start signal transmission line is not short-circuited with the second transmission line when the comparison result indicates that the scan start signal is not greater than the reference voltage at the falling edge of the vertical start signal.

In exemplary embodiments, the short-circuit detection circuit may include a current comparison block configured to sense a transmission line current flowing through the scan start signal transmission line at a time point where a set (e.g., predetermined) time elapses from a rising edge of a vertical start signal and to output a comparison result by comparing the transmission line current with a reference current, and a short-circuit determination block configured to determine whether the scan start signal transmission line is short-circuited based on the comparison result and to operate the over-current protection circuit by providing a short-circuit detection signal to the over-current protection circuit when the scan start signal transmission line is short-circuited.

In exemplary embodiments, the short-circuit determination block may determine that the scan start signal transmission line is short-circuited with a first transmission line through which a low power voltage is transmitted or a second transmission line through which a high power voltage is transmitted when the comparison result indicates that a current difference between the transmission line current and the reference current is greater than a reference value.

In exemplary embodiments, the short-circuit determination block may determine that the scan start signal transmission line is not short-circuited with the first transmission line or the second transmission line when the comparison result indicates that the current difference between the transmission line current and the reference current is less than the reference value.

Therefore, a short-circuit detection circuit according to exemplary embodiments may receive a scan start signal from a scan start signal transmission line through which the scan start signal is transmitted, may receive a reference voltage from a reference voltage source, may output a comparison result by comparing the scan start signal with the reference voltage at a falling edge of a vertical start signal, may determine whether the scan start signal transmission line is short-circuited based on the comparison result, and may operate an over-current protection circuit (e.g., may turn off a display panel driving circuit and/or a power management integrated circuit, etc.) by providing a short-circuit detection signal to the over-current protection circuit when the scan start signal transmission line is short-circuited. Thus, the short-circuit detection circuit may prevent (or reduce) serious product liability accidents due to malfunction of a display device from occurring although the scan start signal transmission line is short-circuited with a transmission line through which a low power voltage or a high power voltage is transmitted.

In addition, a short-circuit detection circuit according to exemplary embodiments may sense a transmission line current flowing through a scan start signal transmission line through which a scan start signal is transmitted at a time point where a set (e.g., predetermined) time elapses from a rising edge of a vertical start signal, may output a comparison result by comparing the transmission line current with a reference current, may determine whether the scan start signal transmission line is short-circuited based on the comparison result, and may operate an over-current protection circuit by providing a short-circuit detection signal to the over-current protection circuit when the scan start signal transmission line is short-circuited. Thus, the short-circuit detection circuit may prevent (or reduce) serious product liability accidents due to malfunction of a display device from occurring although the scan start signal transmission line is short-circuited with a transmission line through which a low power voltage or a high power voltage is transmitted.

Furthermore, a display device including the short-circuit detection circuit according to exemplary embodiments may prevent (or reduce) serious product liability accidents due to malfunction of the display device from occurring.

BRIEF DESCRIPTION OF THE DRAWINGS

Illustrative, non-limiting exemplary embodiments will be more clearly understood from the following detailed description in conjunction with the accompanying drawings.

DETAILED DESCRIPTION

Hereinafter, embodiments of the present disclosure will be explained in more detail with reference to the accompanying drawings.

Figure 1:
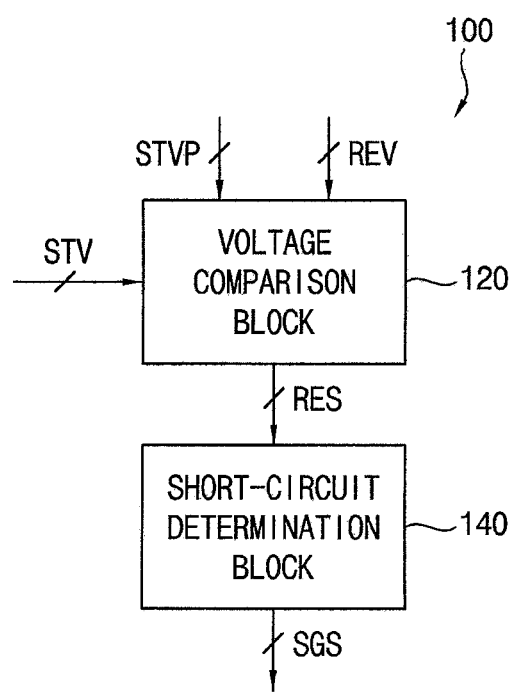
FIG. 1 is a block diagram illustrating a short-circuit detection circuit according to exemplary embodiments.
Figure 2A:
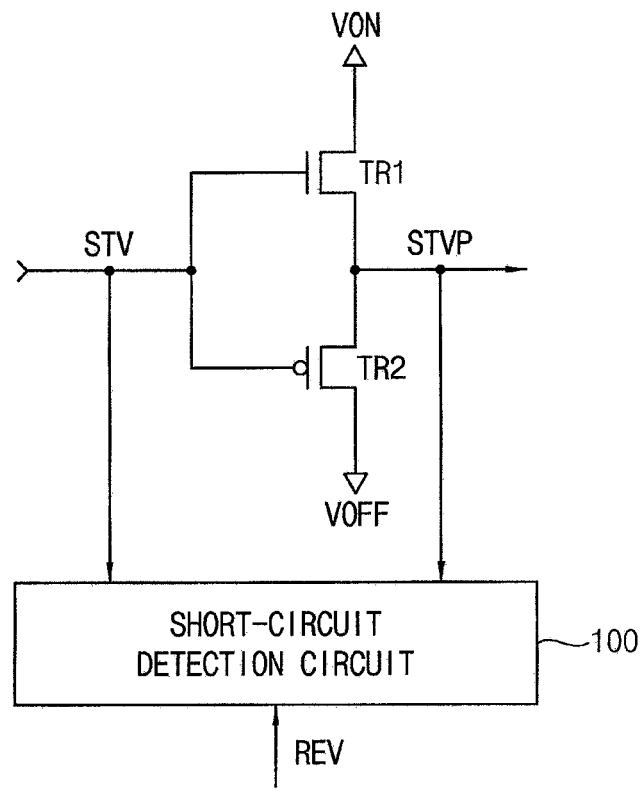
FIGS. 2A-2B are diagrams illustrating an operation of the short-circuit detection circuit of FIG. 1.
Figure 2B:
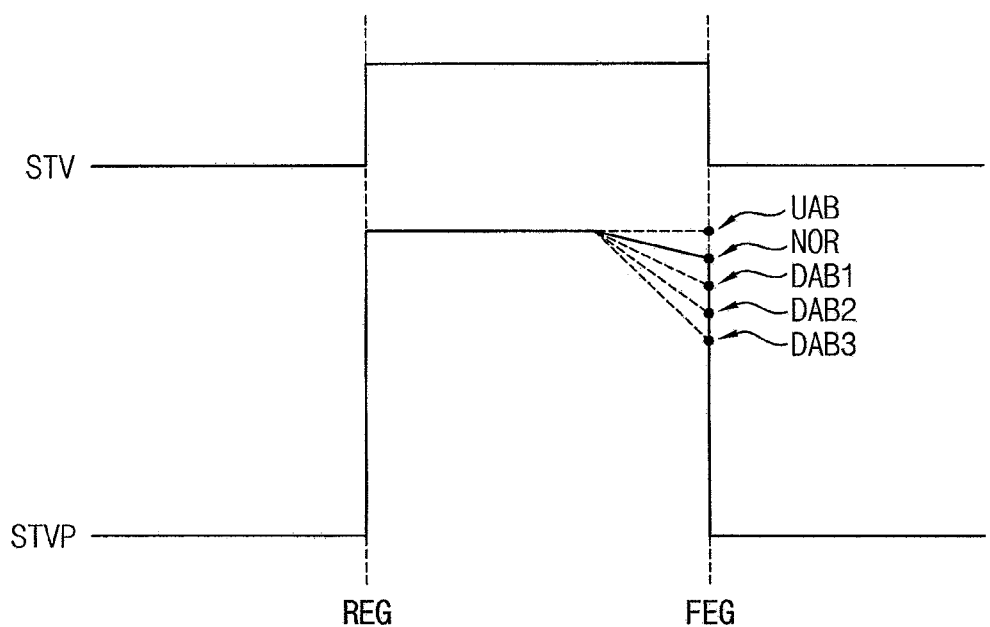

FIG. 1 is a block diagram illustrating a short-circuit detection circuit according to exemplary embodiments, and FIGS. 2A-2B are diagrams for describing an operation of the short-circuit detection circuit of FIG. 1.

Referring to FIGS. 1-2B, the short-circuit detection circuit 100 may include a voltage comparison block 120 and a short-circuit determination block 140.

Generally, a signal generating block (or a level shifter) included in a scan driver receives a vertical start signal STV and at least one vertical clock signal from a timing controller, generates a scan start signal STVP by performing a level shifting on the vertical start signal STV, generates at least one scan clock signal by performing a level shifting on the at least one vertical clock signal, and provides the scan start signal STVP and the at least one scan clock signal to a shift register block included in the scan driver. For example, FIG. 2A shows an example in which the signal generating block included in the scan driver generates the scan start signal STVP by performing the level shifting on the vertical start signal STV. For example, as illustrated in FIG. 2A, the signal generating block included in the scan driver may include a first transistor TR1 and a second transistor TR2 that are coupled (e.g., connected) in series between a high power voltage VON and a low power voltage VOFF (e.g., a ground voltage). A gate terminal of the first transistor TR1 and a gate terminal of the second transistor TR2 may be coupled to (e.g., connected to) a vertical start signal transmission line. A connection node between the first transistor TR1 and the second transistor TR2 may be coupled to (e.g., connected to) a scan start signal transmission line. The first transistor TR1 may be an n-channel metal oxide semiconductor (NMOS) transistor. The second transistor TR2 may be a p-channel metal oxide semiconductor (PMOS) transistor.

As illustrated in FIG. 2B, when the vertical start signal STV has a high voltage level, the first transistor TR1 may be turned on and the second transistor TR2 may be turned off. Thus, the high power voltage VON may be output at the connection node between the first transistor TR1 and the second transistor TR2. Hence, a high voltage level of the scan start signal STVP may correspond to the high power voltage VON. On the other hand, when the vertical start signal STV has a low voltage level, the first transistor TR1 may be turned off and the second transistor TR2 may be turned on. Thus, the low power voltage VOFF may be output at the connection node between the first transistor TR1 and the second transistor TR2. Hence, a low voltage level of the scan start signal STVP may correspond to the low power voltage VOFF. Here, when the scan start signal transmission line is not short-circuited, the scan start signal transmission line may be in a high-impedance (or high-Z) state. Thus, the scan start signal STVP may be ideally maintained to have the high power voltage VON between a rising edge REG and a falling edge FEG of the vertical start signal STV. However, because a voltage drop occurs in the scan start signal STVP due to natural discharges, etc. as approaching the falling edge FEG of the vertical start signal STV, the scan start signal STVP may have a voltage (i.e., a normal judgment level NOR) which is dropped from the high power voltage VON by a set (e.g., specific) voltage at the falling edge FEG of the vertical start signal STV.

On the other hand, when the scan start signal transmission line is short-circuited, the scan start signal transmission line may not be in the high-impedance state. Thus, the scan start signal STVP may not be maintained to have the high power voltage VON between the rising edge REG and the falling edge FEG of the vertical start signal STV. Hence, when the scan start signal transmission line is short-circuited, the scan start signal STVP may not have the normal judgment level NOR at the falling edge FEG of the vertical start signal STV. For example, when the scan start signal transmission line is short-circuited with a first transmission line through which the low power voltage VOFF (e.g., the ground voltage) is transmitted, the scan start signal STVP may have an abnormal judgment level DAB1, DAB2, or DAB3 that is lower than the normal judgment level NOR at the falling edge FEG of the vertical start signal STV. For example, when the scan start signal transmission line is short-circuited with a second transmission line through which the high power voltage VON is transmitted, the scan start signal STVP may have an abnormal judgment level UAB that is higher than the normal judgment level NOR at the falling edge FEG of the vertical start signal STV. Therefore, the short-circuit detection circuit 100 may detect whether the scan start signal transmission line is short-circuited based on the voltage (i.e., the normal judgment level NOR or the abnormal judgment level UAB, DAB1, DAB2, or DAB3) which the scan start signal STVP has at the falling edge FEG of the vertical start signal STV.

For example, the short-circuit detection circuit 100 may include the voltage comparison block 120 and the short-circuit determination block 140. The voltage comparison block 120 may receive the scan start signal STVP from the scan start signal transmission line, may receive a reference voltage REV from a reference voltage source, and may receive the vertical start signal STV from the vertical start signal transmission line. Thus, the voltage comparison block 120 may output a comparison result RES by comparing the scan start signal STVP with the reference voltage REV at the falling edge FEG of the vertical start signal STV. For example, the voltage comparison block 120 may be a comparator circuit. In this case, the voltage comparison block 120 may include a first terminal which is coupled to (e.g., connected to) the scan start signal transmission line, a second terminal which is coupled to (e.g., connected to) the reference voltage source, and an output terminal which is coupled to (e.g., connected to) the short-circuit determination block 140. In addition, the voltage comparison block 120 may further include a control terminal which is coupled to (e.g., connected to) the vertical start signal transmission line. Thus, the voltage comparison block 120 may detect the falling edge FEG of the vertical start signal SVP which is applied via the control terminal, may compare the scan start signal STVP which is applied via the first terminal with the reference voltage REV which is applied via the second terminal at the falling edge FEG of the vertical start signal STV, and may output the comparison result RES to the short-circuit determination block 140 via the output terminal. In an exemplary embodiment, the reference voltage REV input from the reference voltage source may have a voltage (i.e., the normal judgment level NOR) which the scan start signal STVP has at the falling edge FEG of the vertical start signal STV when the scan start signal transmission line is in the high-impedance state. However, the reference voltage REV input from the reference voltage source is not limited thereto.

The short-circuit determination block 140 may receive the comparison result RES from the voltage comparison block 120 and may determine whether the scan start signal transmission line is short-circuited based on the comparison result RES. Here, the short-circuit determination block 140 may operate an over-current protection circuit by providing a short-circuit detection signal to the over-current protection circuit when the scan start signal transmission line is short-circuited. For example, the over-current protection circuit may turn off a display panel driving circuit and/or a power management integrated circuit of a display device when the short-circuit detection signal indicating that the scan start signal transmission line is short-circuited is received from the short-circuit determination block 140. In an exemplary embodiment, when the comparison result RES indicates that the scan start signal STVP is less than the reference voltage REV at the falling edge FEG of the vertical start signal STV (e.g., the abnormal judgment level DAB1, DAB2, or DAB3), the short-circuit determination block 140 may determine that the scan start signal transmission line is short-circuited with the first transmission line through which the low power voltage VOFF is transmitted. On the other hand, when the comparison result RES indicates that the scan start signal STVP is not less than the reference voltage REV at the falling edge FEG of the vertical start signal STV, the short-circuit determination block 140 may determine that the scan start signal transmission line is not short-circuited with the first transmission line through which the low power voltage VOFF is transmitted. In another exemplary embodiment, when the comparison result RES indicates that the scan start signal STVP is greater than the reference voltage REV at the falling edge FEG of the vertical start signal STV (e.g., the abnormal judgment level UAB), the short-circuit determination block 140 may determine that the scan start signal transmission line is short-circuited with the second transmission line through which the high power voltage VON is transmitted. On the other hand, when the comparison result RES indicates that the scan start signal STVP is not greater than the reference voltage REV at the falling edge FEG of the vertical start signal STV, the short-circuit determination block 140 may determine that the scan start signal transmission line is not short-circuited with the second transmission line through which the high power voltage VON is transmitted.

In some exemplary embodiments, to prevent (or reduce) a misjudgment of whether the scan start signal transmission line is short-circuited due to voltage fluctuation (or voltage jolt) caused by external noises, etc., the short-circuit determination block 140 may set a buffer range in comparing the scan start signal STVP with the reference voltage REV. In an exemplary embodiment, when the comparison result RES indicates that the scan start signal STVP is less than the reference voltage REV by more than a first voltage difference (i.e., the buffer range) at the falling edge FEG of the vertical start signal STV, the short-circuit determination block 140 may determine that the scan start signal transmission line is short-circuited with the first transmission line through which the low power voltage VOFF is transmitted. On the other hand, when the comparison result RES indicates that the scan start signal STVP is not less than the reference voltage REV by more than the first voltage difference at the falling edge FEG of the vertical start signal STV, the short-circuit determination block 140 may determine that the scan start signal transmission line is not short-circuited with the first transmission line through which the low power voltage VOFF is transmitted. Here, the first voltage difference may be determined by considering the voltage fluctuation caused by the external noises, etc. For example, when the voltage fluctuation caused by the external noises, etc. is relatively large, the first voltage difference may be determined to be relatively large. On the other hand, when the voltage fluctuation caused by the external noises, etc. is relatively small, the first voltage difference may be determined to be relatively small. In another exemplary embodiment, when the comparison result RES indicates that the scan start signal STVP is greater than the reference voltage REV by more than a second voltage difference (i.e., the buffer range) at the falling edge FEG of the vertical start signal STV, the short-circuit determination block 140 may determine that the scan start signal transmission line is short-circuited with the second transmission line through which the high power voltage VON is transmitted. On the other hand, when the comparison result RES indicates that the scan start signal STVP is not greater than the reference voltage REV by more than the second voltage difference at the falling edge FEG of the vertical start signal STV, the short-circuit determination block 140 may determine that the scan start signal transmission line is not short-circuited with the second transmission line through which the high power voltage VON is transmitted. Here, the second voltage difference may be determined by considering the voltage fluctuation caused by the external noises, etc.

In brief, the short-circuit detection circuit 100 may receive the scan start signal STVP from the scan start signal transmission line, may receive the reference voltage REV from the reference voltage source, may output the comparison result RES by comparing the scan start signal STVP with the reference voltage REV at the falling edge FEG of the vertical start signal STV, may determine whether the scan start signal transmission line is short-circuited based on the comparison result RES, and may operate the over-current protection circuit (e.g., may turn off the display panel driving circuit and/or the power management integrated circuit, etc.) by providing the short-circuit detection signal SGS to the over-current protection circuit when the scan start signal transmission line is short-circuited. Thus, the short-circuit detection circuit 100 may prevent (or reduce) serious product liability accidents due to malfunction of the display device from occurring although the scan start signal transmission line through which the scan start signal STVP is transmitted is short-circuited with the transmission line through which the low power voltage VOFF or the high power voltage VON is transmitted. Although it is described above that the low power voltage VOFF and the high power voltage VON are voltages which are used for level-shifting the vertical start signal STV to the scan start signal STVP, it should be understood that the low power voltage VOFF and the high power voltage VON are not limited to the voltages which are used for level-shifting the vertical start signal STV to the scan start signal STVP. For example, the voltage which the scan start signal STVP has at the falling edge FEG of the vertical start signal STV may be different from the normal judgment level NOR even when the scan start signal transmission line is short-circuited with a transmission line through which a signal having a voltage different from that of the scan start signal STVP is transmitted.

Figure 3:
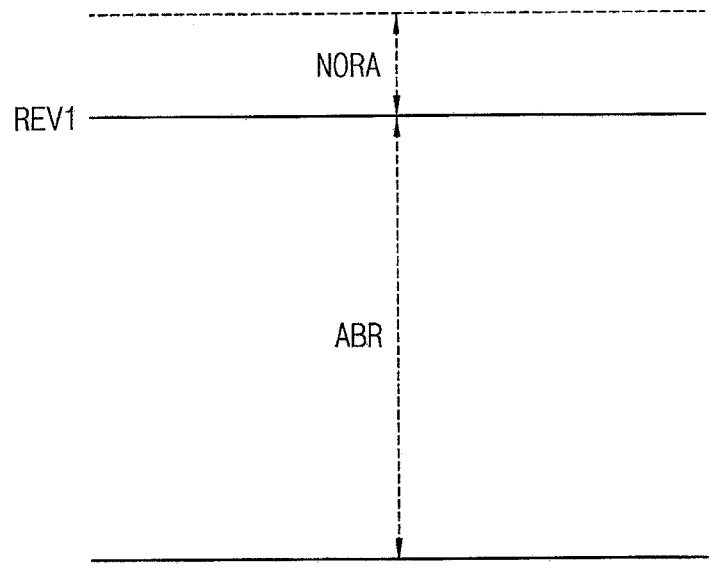
FIG. 3 is a diagram illustrating an example in which the short-circuit detection circuit of FIG. 1 determines whether a scan start signal transmission line is short-circuited with a first transmission line through which a low power voltage is transmitted.
Figure 4:
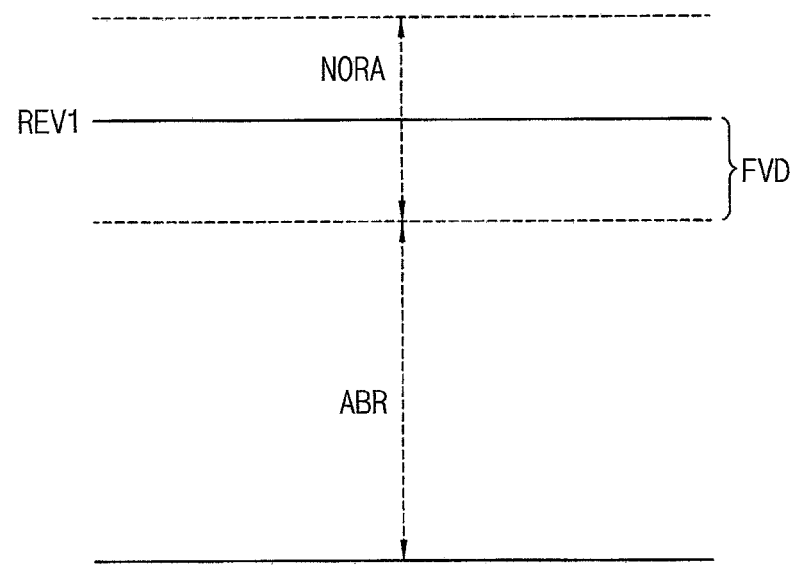
FIG. 4 is a diagram illustrating another example in which the short-circuit detection circuit of FIG. 1 determines whether a scan start signal transmission line is short-circuited with a first transmission line through which a low power voltage is transmitted.

FIG. 3 is a diagram illustrating an example in which the short-circuit detection circuit of FIG. 1 determines whether a scan start signal transmission line is short-circuited with a first transmission line through which a low power voltage is transmitted, and FIG. 4 is a diagram illustrating another example in which the short-circuit detection circuit of FIG. 1 determines whether a scan start signal transmission line is short-circuited with a first transmission line through which a low power voltage is transmitted.

Referring to FIGS. 3-4, the short-circuit detection circuit 100 may determine whether the scan start signal transmission line is short-circuited with the first transmission line through which the low power voltage VOFF is transmitted by comparing the scan start signal STVP which is received from the scan start signal transmission line with the reference voltage REV1 which is received from the reference voltage source at the falling edge FEG of the vertical start signal STV which is received from the vertical start signal transmission line. In an exemplary embodiment, as illustrated in FIG. 3, the short-circuit detection circuit 100 may determine that the scan start signal transmission line is short-circuited with the first transmission line through which the low power voltage VOFF is transmitted when the scan start signal STVP is less than the reference voltage REV1 at the falling edge FEG of the vertical start signal STV and may determine that the scan start signal transmission line is not short-circuited with the first transmission line through which the low power voltage VOFF is transmitted when the scan start signal STVP is not less than the reference voltage REV1 at the falling edge FEG of the vertical start signal STV. In other words, the short-circuit detection circuit 100 may determine that the scan start signal transmission line is short-circuited with the first transmission line through which the low power voltage VOFF is transmitted when the scan start signal STVP has a voltage belonging to a short-circuit judgment range ABR at the falling edge FEG of the vertical start signal STV and may determine that the scan start signal transmission line is not short-circuited with the first transmission line through which the low power voltage VOFF is transmitted when the scan start signal STVP has a voltage belonging to a non-short-circuit judgment range NORA at the falling edge FEG of the vertical start signal STV.

In some exemplary embodiments, to prevent (or reduce) the misjudgment of whether the scan start signal transmission line is short-circuited due to the voltage fluctuation caused by the external noises, etc., the short-circuit detection circuit 100 may set the buffer range (i.e., the first voltage difference FVD) in comparing the scan start signal STVP with the reference voltage REV1. Here, the buffer range (i.e., the first voltage difference FVD) may be determined by considering the voltage fluctuation caused by the external noises, etc. In an exemplary embodiment, when the scan start signal STVP is less than the reference voltage REV1 by more than the first voltage difference FVD at the falling edge FEG of the vertical start signal STV, the short-circuit detection circuit 100 may determine that the scan start signal transmission line is short-circuited with the first transmission line through which the low power voltage VOFF is transmitted. On the other hand, when the scan start signal STVP is not less than the reference voltage REV1 by more than the first voltage difference FVD at the falling edge FEG of the vertical start signal STV, the short-circuit detection circuit 100 may determine that the scan start signal transmission line is not short-circuited with the first transmission line through which the low power voltage VOFF is transmitted. In other words, the short-circuit detection circuit 100 may determine that the scan start signal transmission line is short-circuited with the first transmission line through which the low power voltage VOFF is transmitted when the scan start signal STVP has a voltage belonging to a short-circuit judgment range ABR at the falling edge FEG of the vertical start signal STV and may determine that the scan start signal transmission line is not short-circuited with the first transmission line through which the low power voltage VOFF is transmitted when the scan start signal STVP has a voltage belonging to a non-short-circuit judgment range NORA at the falling edge FEG of the vertical start signal STV.

Figure 5:
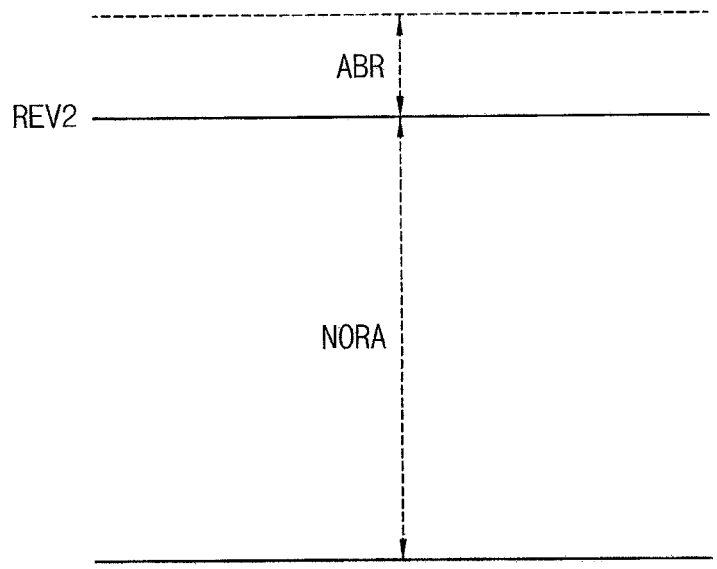
FIG. 5 is a diagram illustrating an example in which the short-circuit detection circuit of FIG. 1 determines whether a scan start signal transmission line is short-circuited with a second transmission line through which a high power voltage is transmitted.
Figure 6:
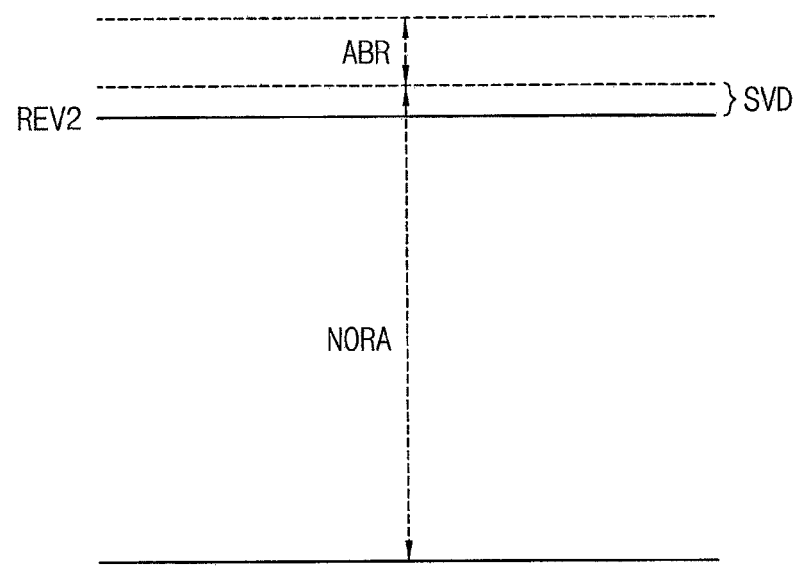
FIG. 6 is a diagram illustrating another example in which the short-circuit detection circuit of FIG. 1 determines whether a scan start signal transmission line is short-circuited with a second transmission line through which a high power voltage is transmitted.

FIG. 5 is a diagram illustrating an example in which the short-circuit detection circuit of FIG. 1 determines whether a scan start signal transmission line is short-circuited with a second transmission line through which a high power voltage is transmitted, and FIG. 6 is a diagram illustrating another example in which the short-circuit detection circuit of FIG. 1 determines whether a scan start signal transmission line is short-circuited with a second transmission line through which a high power voltage is transmitted.

Referring to FIGS. 5-6, the short-circuit detection circuit 100 may determine whether the scan start signal transmission line is short-circuited with the second transmission line through which the high power voltage VON is transmitted by comparing the scan start signal STVP which is received from the scan start signal transmission line with the reference voltage REV2 which is received from the reference voltage source at the falling edge FEG of the vertical start signal STV which is received from the vertical start signal transmission line. In an exemplary embodiment, as illustrated in FIG. 5, the short-circuit detection circuit 100 may determine that the scan start signal transmission line is short-circuited with the second transmission line through which the high power voltage VON is transmitted when the scan start signal STVP is greater than the reference voltage REV2 at the falling edge FEG of the vertical start signal STV and may determine that the scan start signal transmission line is not short-circuited with the second transmission line through which the high power voltage VON is transmitted when the scan start signal STVP is not greater than the reference voltage REV2 at the falling edge FEG of the vertical start signal STV. In other words, the short-circuit detection circuit 100 may determine that the scan start signal transmission line is short-circuited with the second transmission line through which the high power voltage VON is transmitted when the scan start signal STVP has a voltage belonging to a short-circuit judgment range ABR at the falling edge FEG of the vertical start signal STV and may determine that the scan start signal transmission line is not short-circuited with the second transmission line through which the high power voltage VON is transmitted when the scan start signal STVP has a voltage belonging to a non-short-circuit judgment range NORA at the falling edge FEG of the vertical start signal STV.

In some exemplary embodiments, to prevent (or reduce) the misjudgment of whether the scan start signal transmission line is short-circuited due to the voltage fluctuation caused by the external noises, etc., the short-circuit detection circuit 100 may set the buffer range (i.e., the second voltage difference SVD) in comparing the scan start signal STVP with the reference voltage REV2. Here, the buffer range (i.e., the second voltage difference SVD) may be determined by considering the voltage fluctuation caused by the external noises, etc. In an exemplary embodiment, when the scan start signal STVP is greater than the reference voltage REV2 by more than the second voltage difference SVD at the falling edge FEG of the vertical start signal STV, the short-circuit detection circuit 100 may determine that the scan start signal transmission line is short-circuited with the second transmission line through which the high power voltage VON is transmitted. On the other hand, when the scan start signal STVP is not greater than the reference voltage REV2 by more than the second voltage difference SVD at the falling edge FEG of the vertical start signal STV, the short-circuit detection circuit 100 may determine that the scan start signal transmission line is not short-circuited with the second transmission line through which the high power voltage VON is transmitted. In other words, the short-circuit detection circuit 100 may determine that the scan start signal transmission line is short-circuited with the second transmission line through which the high power voltage VON is transmitted when the scan start signal STVP has a voltage belonging to a short-circuit judgment range ABR at the falling edge FEG of the vertical start signal STV and may determine that the scan start signal transmission line is not short-circuited with the second transmission line through which the high power voltage VON is transmitted when the scan start signal STVP has a voltage belonging to a non-short-circuit judgment range NORA at the falling edge FEG of the vertical start signal STV.

Figure 7:
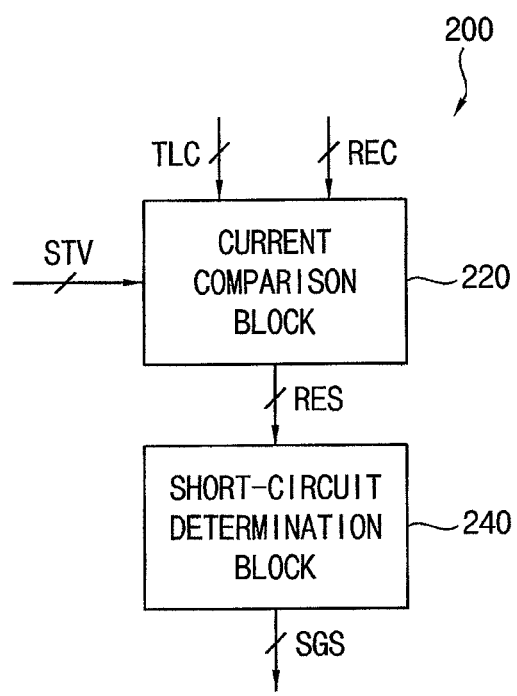
FIG. 7 is a block diagram illustrating a short-circuit detection circuit according to exemplary embodiments.
Figure 8A:
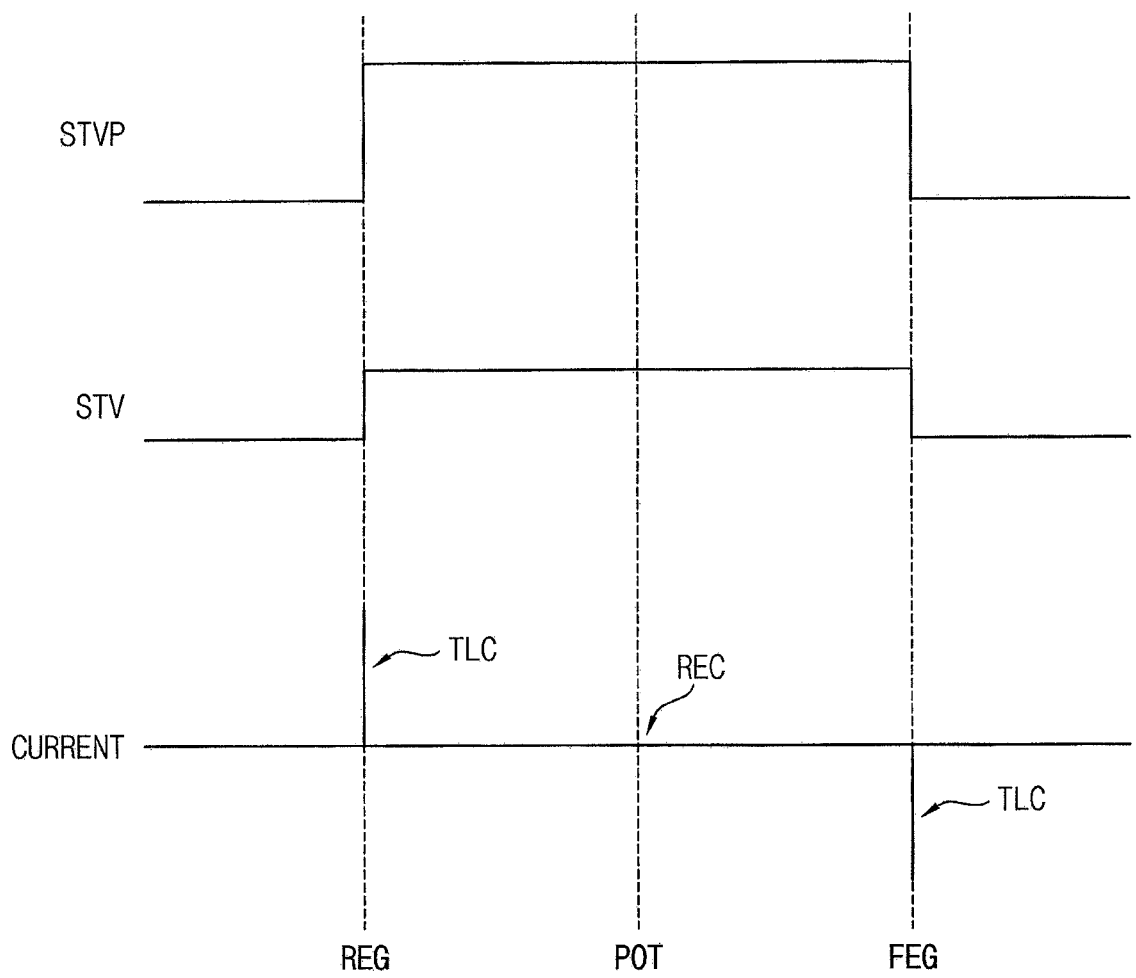
FIGS. 8A-8B are diagrams illustrating an operation of the short-circuit detection circuit of FIG. 7.
Figure 8B:
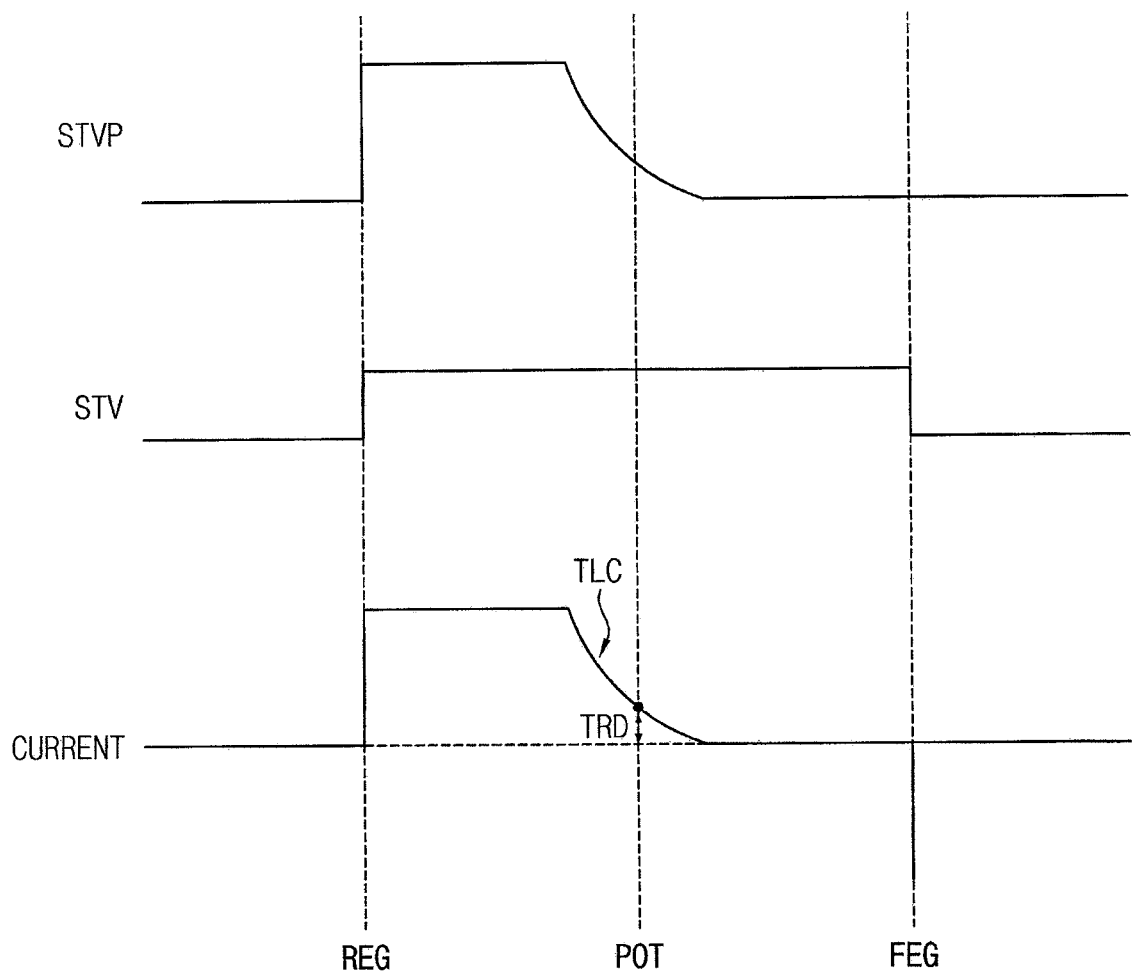

FIG. 7 is a block diagram illustrating a short-circuit detection circuit according to exemplary embodiments, and FIGS. 8A-8B are diagrams for describing an operation of the short-circuit detection circuit of FIG. 7.

Referring to FIGS. 7-8B, the short-circuit detection circuit 200 may include a current comparison block 220 and a short-circuit determination block 240.

A signal generating block included in a scan driver may generate a scan start signal STVP by performing a level shifting on a vertical start signal STV. Here, when a scan start signal transmission line through which the scan start signal STVP is transmitted is not short-circuited, the scan start signal transmission line may be in a high-impedance state. Thus, a transmission line current TLC flowing through the scan start signal transmission line may not substantially exist between a rising edge REG and a falling edge FEG of the vertical start signal STV. As illustrated in FIG. 8A, the transmission line current TLC flowing through the scan start signal transmission line may momentarily exist only at the rising edge REG and the falling edge FEG of the vertical start signal STV. For example, the transmission line current TLC flowing through the scan start signal transmission line may not substantially exist between the rising edge REG and the falling edge FEG of the vertical start signal STV. For example, between the rising edge REG and the falling edge FEG of the vertical start signal STV, the transmission line current TLC flowing through the scan start signal transmission line may be equal to a reference current REC (e.g., zero). On the other hand, when the scan start signal transmission line is short-circuited, the scan start signal transmission line may not be in the high-impedance state. Thus, the transmission line current TLC flowing through the scan start signal transmission line may exist between the rising edge REG and the falling edge FEG of the vertical start signal STV. As illustrated in FIG. 8B, the transmission line current TLC flowing through the scan start signal transmission line may exist between the rising edge REG and the falling edge FEG of the vertical start signal STV, a voltage which the scan start signal STVP has may decrease as the scan start signal transmission line is discharged, and thus the transmission line current TLC flowing through the scan start signal transmission line may gradually disappear as approaching the falling edge FEG of the vertical start signal STV. In brief, because the transmission line current TLC flowing through the scan start signal transmission line exists at a time point POT where a set (e.g., predetermined) time elapses from the rising edge REG of the vertical start signal STV (i.e., indicated by TRD) when the scan start signal transmission line is short-circuited, the short-circuit detection circuit 200 may detect whether the scan start signal transmission line is short-circuited based on whether the transmission line current TLC flowing through the scan start signal transmission line exists at the time point POT where the set (e.g., predetermined) time elapses from the rising edge REG of the vertical start signal STV.

For example, the short-circuit detection circuit 200 may include the current comparison block 220 and the short-circuit determination block 240. The current comparison block 220 may sense the transmission line current TLC flowing through the scan start signal transmission line through which the scan start signal STVP is transmitted, may set the reference current REC (e.g., zero), and may receive the vertical start signal STV from a vertical start signal transmission line. Thus, the current comparison block 220 may output a comparison result RES by comparing the transmission line current TLC with the reference current REC at the time point POT where the set (e.g., predetermined) time elapses from the rising edge REG of the vertical start signal STV. Here, the set (e.g., predetermined) time may be set to be shorter than a time in which the transmission line current TLC flowing through the scan start signal transmission line completely disappears when the scan start signal transmission line is short-circuited. The short-circuit determination block 240 may receive the comparison result RES from the current comparison block 220 and may determine whether the scan start signal transmission line is short-circuited based on the comparison result RES. Here, the short-circuit determination block 240 may operate an over-current protection circuit by providing a short-circuit detection signal to the over-current protection circuit when the scan start signal transmission line is short-circuited. For example, the over-current protection circuit may turn off a display panel driving circuit and/or a power management integrated circuit of a display device when the short-circuit detection signal indicating that the scan start signal transmission line is short-circuited is received from the short-circuit determination block 240. In an exemplary embodiment, the short-circuit determination block 240 may determine that the scan start signal transmission line is short-circuited with a first transmission line through which a low power voltage VOFF is transmitted or a second transmission line through which a high power voltage VON is transmitted when the comparison result RES indicates that a current difference between the transmission line current TLC and the reference current REC is greater than a reference value. On the other hand, the short-circuit determination block 240 may determine that the scan start signal transmission line is not short-circuited with the first transmission line through which the low power voltage VOFF is transmitted or the second transmission line through which the high power voltage VON is transmitted when the comparison result RES indicates that the current difference between the transmission line current TLC and the reference current REC is less than the reference value. In an exemplary embodiment, the reference value may be determined by considering voltage fluctuation caused by external noises, etc. For example, when the voltage fluctuation caused by the external noises, etc. is relatively large, the reference value may be determined to be relatively large. On the other hand, when the voltage fluctuation caused by the external noises, etc. is relatively small, the reference value may be determined to be relatively small.

In brief, the short-circuit detection circuit 200 may sense the transmission line current TLC flowing through the scan start signal transmission line at the time point POT where the set (e.g., predetermined) time elapses from the rising edge REG of the vertical start signal STV, may output the comparison result RES by comparing the transmission line current TLC with the reference current REC, may determine whether the scan start signal transmission line is short-circuited based on the comparison result RES, and may operate the over-current protection circuit (e.g., may turn off the display panel driving circuit and/or the power management integrated circuit, etc.) by providing the short-circuit detection signal SGS to the over-current protection circuit when the scan start signal transmission line is short-circuited. Thus, the short-circuit detection circuit 200 may prevent (or reduce) serious product liability accidents due to malfunction of the display device from occurring although the scan start signal transmission line through which the scan start signal STVP is transmitted is short-circuited with the transmission line through which the low power voltage VOFF or the high power voltage VON is transmitted. Although it is described above that the low power voltage VOFF and the high power voltage VON are voltages which are used for level-shifting the vertical start signal STV to the scan start signal STVP, it should be understood that the low power voltage VOFF and the high power voltage VON are not limited to the voltages which are used for level-shifting the vertical start signal STV to the scan start signal STVP. For example, the transmission line current TLC flowing through the scan start signal transmission line may exist at the time point POT where the set (e.g., predetermined) time elapses from the rising edge REG of the vertical start signal STV even when the scan start signal transmission line is short-circuited with a transmission line through which a signal having a voltage different from that of the scan start signal STVP is transmitted.

Figure 9:
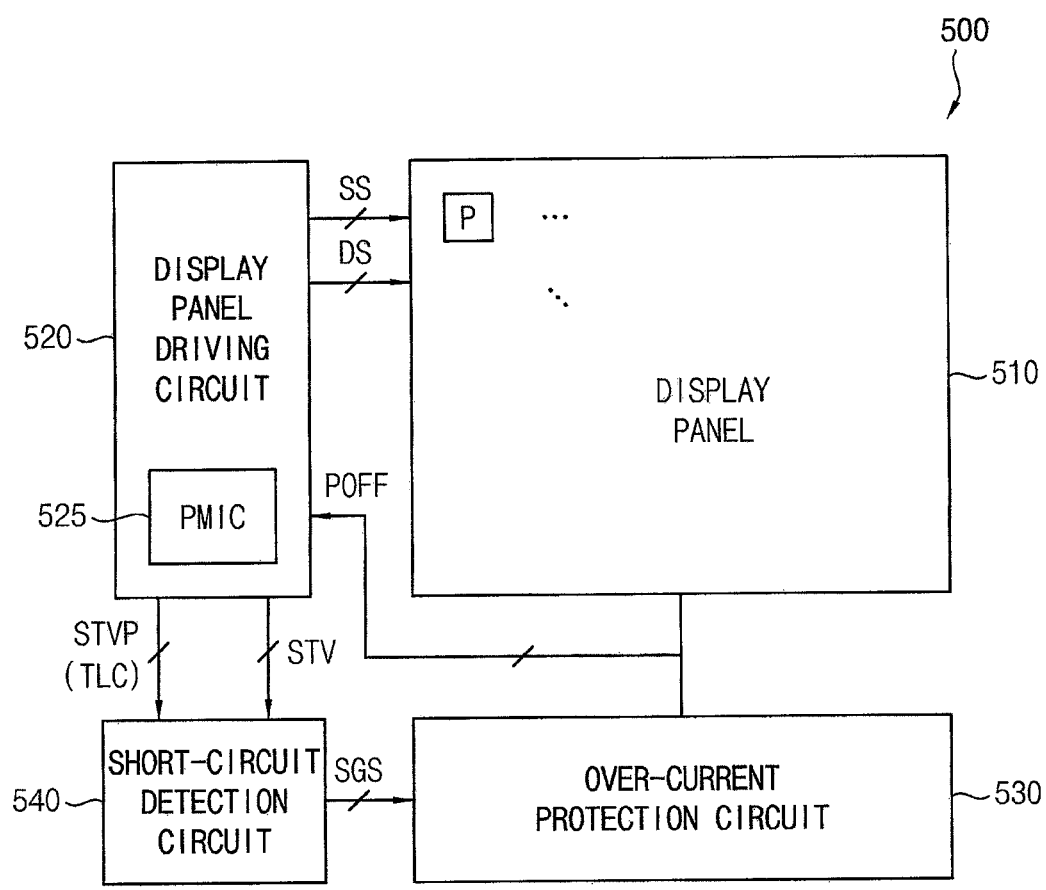
FIG. 9 is a block diagram illustrating a display device according to exemplary embodiments.

FIG. 9 is a block diagram illustrating a display device according to exemplary embodiments.

Referring to FIG. 9, the display device 500 may include a display panel 510, a display panel driving circuit 520, a power management integrated circuit 525, an over-current protection circuit 530, and a short-circuit detection circuit 540. Here, the display device 500 may be an OLED device or an LCD device. However, the display device 500 is not limited thereto.

The display panel 510 may include a plurality of pixel circuits P. Here, the pixel circuits P may be arranged in various suitable forms (e.g., a matrix form, etc.) in the display panel 510. The display panel driving circuit 520 may drive the display panel 510. To this end, the display panel driving circuit 520 may include a scan driver, a data driver, a timing controller, etc. The display panel 510 may be coupled to (e.g., connected to) the scan driver via scan-lines. Thus, the scan driver may provide a scan signal SS to the pixel circuits P included in the display panel 510 via the scan-lines. The display panel 510 may be coupled to (e.g., connected to) the data driver via data-lines. Thus, the data driver may receive image data from the timing controller, may convert the image data into a data signal DS (i.e., a data voltage), and may provide the data signal DS to the pixel circuits P included in the display panel 510 via the data-lines. The timing controller may control the scan driver and the data driver. For this operation, the timing controller may generate a plurality of signals for controlling the scan driver and the data driver using power supplied from the power management integrated circuit 525. In some exemplary embodiments, the timing controller may receive the image data from an external component, may perform a given processing (e.g., a data compensation processing, etc.) on the image data, and may provide the processed image data to the data driver. In some exemplary embodiments, the display panel driving circuit 520 may further include an emission control driver. In this case, the emission control driver may be coupled to (e.g., connected to) the display panel 510 via emission control-lines. Thus, the emission control driver may provide an emission control signal to the pixel circuits P included in the display panel 510 via the emission control-lines. The power management integrated circuit 525 may provide power to the display panel 510 and the display panel driving circuit 520. In an exemplary embodiment, as illustrated in FIG. 9, the power management integrated circuit 525 may be implemented internally to the display panel driving circuit 520. In another exemplary embodiment, the power management integrated circuit 525 may be implemented externally to the display panel driving circuit 520.

The over-current protection circuit 530 may turn off at least one selected from the display panel driving circuit 520 and the power management integrated circuit 525 when a short-circuit is detected in the display panel driving circuit 520. For example, when a short-circuit detection signal SGS is input from the short-circuit detection circuit 540, the over-current protection circuit 530 may turn off at least one selected from the display panel driving circuit 520 and the power management integrated circuit 525 by providing (or outputting) a power off signal POFF to at least one selected from the display panel driving circuit 520 and the power management integrated circuit 525. In some exemplary embodiments, when a short-circuit (e.g., a short-circuit of the scan-lines, a short-circuit of the data-lines, a short-circuit of the emission control-lines, etc.) is detected in the display panel 510, the over-current protection circuit 530 may turn off at least one selected from the display panel driving circuit 520 and the power management integrated circuit 525. Thus, the over-current protection circuit 530 may prevent (or reduce) serious product liability accidents due to malfunction (e.g., breakage, fire, etc.) of the display device 500, which is likely to occur when the display panel driving circuit 520 and/or the power management integrated circuit 525 continuously operates despite the presence of the short-circuit in the display panel driving circuit 520 and/or the display panel 510. In an exemplary embodiment, as illustrated in FIG. 9, the over-current protection circuit 530 may be implemented externally to the display panel driving circuit 520. In another exemplary embodiment, the over-current protection circuit 530 may be implemented internally to the display panel driving circuit 520. The short-circuit detection circuit 540 may detect whether the scan start signal transmission line is short-circuited in the display panel driving circuit 520 and may operate the over-current protection circuit 530 when the scan start signal transmission line is short-circuited. For example, the short-circuit detection circuit 540 may operate the over-current protection circuit 530 by providing the short-circuit detection signal SGS to the over-current protection circuit 530 when the scan start signal transmission line is short-circuited. In an exemplary embodiment, as illustrated in FIG. 9, the short-circuit detection circuit 540 may be implemented externally to the display panel driving circuit 520. In another exemplary embodiment, the short-circuit detection circuit 540 may be implemented internally to the display panel driving circuit 520.

In an exemplary embodiment, the short-circuit detection circuit 540 may include a voltage comparison block and a short-circuit determination block. The voltage comparison block may receive a scan start signal STVP from the scan start signal transmission line, may receive a reference voltage from a reference voltage source, and may output a comparison result by comparing the scan start signal STVP with the reference voltage at a falling edge of a vertical start signal STV. The short-circuit determination block may determine whether the scan start signal transmission line is short-circuited based on the comparison result and may operate the over-current protection circuit 530 by providing the short-circuit detection signal SGS to the over-current protection circuit 530 when the scan start signal transmission line is short-circuited. For example, when the scan start signal STVP is less than the reference voltage at the falling edge of the vertical start signal STV, the short-circuit detection circuit 540 may determine that the scan start signal transmission line is short-circuited with a first transmission line through which a low power voltage is transmitted. On the other hand, when the scan start signal STVP is not less than the reference voltage at the falling edge of the vertical start signal STV, the short-circuit detection circuit 540 may determine that the scan start signal transmission line is not short-circuited with the first transmission line through which the low power voltage is transmitted. In addition, when the scan start signal STVP is greater than the reference voltage at the falling edge of the vertical start signal STV, the short-circuit detection circuit 540 may determine that the scan start signal transmission line is short-circuited with a second transmission line through which a high power voltage is transmitted. On the other hand, when the scan start signal STVP is not greater than the reference voltage at the falling edge of the vertical start signal STV, the short-circuit detection circuit 540 may determine that the scan start signal transmission line is not short-circuited with the second transmission line through which the high power voltage is transmitted. For another example, when the scan start signal STVP is less than the reference voltage by more than a first voltage difference at the falling edge of the vertical start signal STV, the short-circuit detection circuit 540 may determine that the scan start signal transmission line is short-circuited with the first transmission line through which the low power voltage is transmitted. On the other hand, when the scan start signal STVP is not less than the reference voltage by more than the first voltage difference at the falling edge of the vertical start signal STV, the short-circuit detection circuit 540 may determine that the scan start signal transmission line is not short-circuited with the first transmission line through which the low power voltage is transmitted. In addition, when the scan start signal STVP is greater than the reference voltage by more than a second voltage difference at the falling edge of the vertical start signal STV, the short-circuit detection circuit 540 may determine that the scan start signal transmission line is short-circuited with the second transmission line through which the high power voltage is transmitted. On the other hand, when the scan start signal STVP is not greater than the reference voltage by more than the second voltage difference at the falling edge of the vertical start signal STV, the short-circuit detection circuit 540 may determine that the scan start signal transmission line is not short-circuited with the second transmission line through which the high power voltage is transmitted. Since the above operations are described with reference to FIGS. 1-6, redundant description thereof will not be repeated here.

In another exemplary embodiment, the short-circuit detection circuit 540 may include a current comparison block and a short-circuit determination block. The current comparison block may sense a transmission line current TLC flowing through the scan start signal transmission line through which the scan start signal STVP is transmitted at a time point where a set (e.g., predetermined) time elapses from a rising edge of the vertical start signal STV and may output a comparison result by comparing the transmission line current TLC with a reference current. The short-circuit determination block may determine whether the scan start signal transmission line is short-circuited based on the comparison result and may operate the over-current protection circuit 530 by providing the short-circuit detection signal SGS to the over-current protection circuit 530 when the scan start signal transmission line is short-circuited. For example, when a current difference between the transmission line current TLC and the reference current is greater than a reference value, the short-circuit detection circuit 540 may determine that the scan start signal transmission line through which the scan start signal STVP is transmitted is short-circuited with the first transmission line through which the low power voltage is transmitted or the second transmission line through which the high power voltage is transmitted. On the other hand, when the current difference between the transmission line current TLC and the reference current is less than the reference value, the short-circuit detection circuit 540 may determine that the scan start signal transmission line through which the scan start signal STVP is transmitted is not short-circuited with the first transmission line through which the low power voltage is transmitted or the second transmission line through which the high power voltage is transmitted. Since the above operations are described with reference to FIGS. 7-8B, redundant description thereof will not be repeated here.

In some exemplary embodiments, the display panel driving circuit 520 may store a short-circuit occurrence record indicating that the scan start signal transmission line through which the scan start signal STVP is transmitted is short-circuited when the scan start signal transmission line through which the scan start signal STVP is transmitted is short-circuited. Thus, when the short-circuit occurrence record is stored in the display panel driving circuit 520 of a target display device 500 after a product shipping test is performed on the target display device 500, the target display device 500 may be determined as a defective product. Thus, the display device 500 may not be sold to a consumer if the scan start signal transmission line is short-circuited in the display device 500. Hence, in a manufacturing step, it is possible to prevent (or reduce) serious product liability accidents due to malfunction (e.g., breakage, fire, etc.) of the display device 500, which is caused by the short-circuit, from occurring. As described above, the display device 500 may effectively detect the short-circuit by using the reference voltage and the scan start signal STVP at the falling edge of the vertical start signal STV or by using the reference current and the transmission line current TLC at the rising edge of the vertical start signal STV. Thus, the display device 500 may prevent (or reduce) the serious product liability accidents due to malfunction of the display device 500 from occurring although the scan start signal transmission line is short-circuited with the transmission line through which the low power voltage or the high power voltage is transmitted. Although it is described above that the display device 500 includes the display panel 510, the display panel driving circuit 520, the power management integrated circuit 525, the over-current protection circuit 530, and the short-circuit detection circuit 540, components of the display device 500 are not limited thereto. For example, in some exemplary embodiments, the display device 500 may further include other components such as a deterioration compensation circuit that performs deterioration compensation on the pixel circuits P included in the display panel 510.

Figure 10:
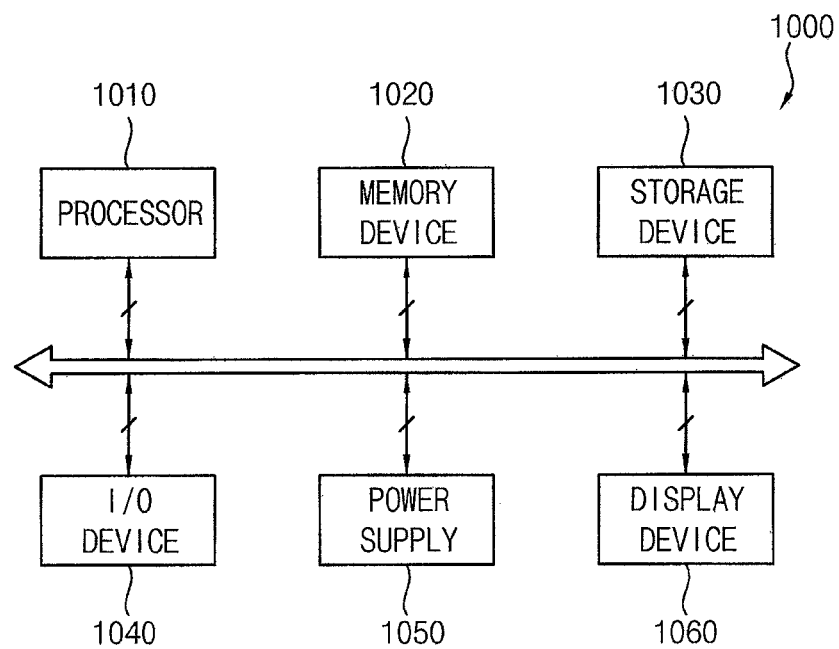
FIG. 10 is a block diagram illustrating an electronic device according to exemplary embodiments.
Figure 11:
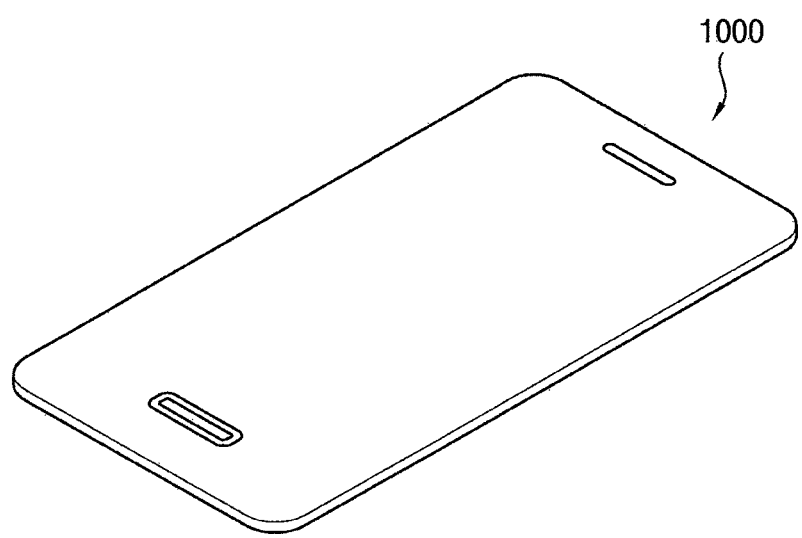
FIG. 11 is a diagram illustrating an example in which the electronic device of FIG. 10 is implemented as a smart phone.
Figure 12:
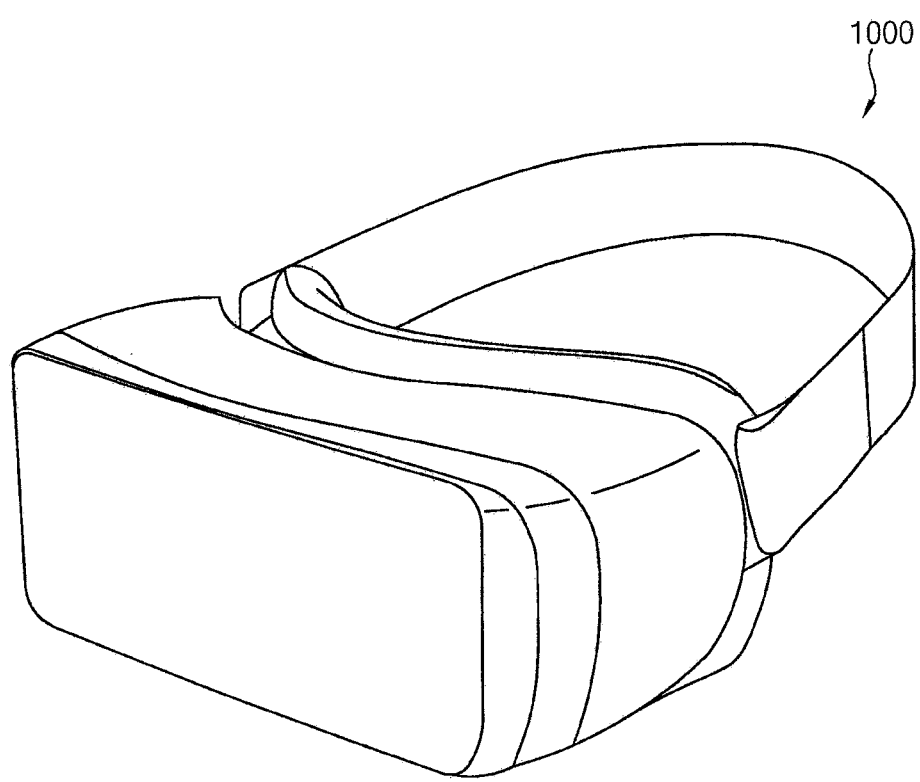
FIG. 12 is a diagram illustrating an example in which the electronic device of FIG. 10 is implemented as a head mounted display (HMD) device.

FIG. 10 is a block diagram illustrating an electronic device according to exemplary embodiments, FIG. 11 is a diagram illustrating an example in which the electronic device of FIG. 10 is implemented as a smart phone, and FIG. 12 is a diagram illustrating an example in which the electronic device of FIG. 10 is implemented as a head mounted display (HMD) device.

Referring to FIGS. 10-12, the electronic device 1000 may include a processor 1010, a memory device 1020, a storage device 1030, an input/output (I/O) device 1040, a power supply 1050, and a display device 1060. Here, the display device 1060 may be the display device 500 of FIG. 9. In addition, the electronic device 1000 may further include a plurality of ports for communicating with a video card, a sound card, a memory card, a universal serial bus (USB) device, other electronic devices, etc. In an exemplary embodiment, as illustrated in FIG. 11, the electronic device 1000 may be implemented as a smart phone. In another exemplary embodiment, as illustrated in FIG. 12, the electronic device 1000 may be implemented as an HMD device. However, the electronic device 1000 is not limited thereto. For example, the electronic device 1000 may be implemented as a television, a cellular phone, a video phone, a smart pad, a smart watch, a tablet PC, a car navigation system, a computer monitor, a laptop, etc.

The processor 1010 may perform various suitable computing functions. The processor 1010 may be a microprocessor, a central processing unit (CPU), an application processor (AP), etc. The processor 1010 may be coupled to other components via an address bus, a control bus, a data bus, etc. Further, the processor 1010 may be coupled to an extended bus such as a peripheral component interconnection (PCI) bus. The memory device 1020 may store data for operations of the electronic device 1000. For example, the memory device 1020 may include at least one non-volatile memory device such as an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM) device, a ferroelectric random access memory (FRAM) device, etc., and/or at least one volatile memory device such as a dynamic random access memory (DRAM) device, a static random access memory (SRAM) device, a mobile DRAM device, etc. The storage device 1030 may include a solid state drive (SSD) device, a hard disk drive (HDD) device, a CD-ROM device, etc. The I/O device 1040 may include an input device such as a keyboard, a keypad, a mouse device, a touchpad, a touch-screen, etc., and an output device such as a printer, a speaker, etc. In some exemplary embodiments, the display device 1060 may be included in the I/O device 1040. The power supply 1050 may provide power for operations of the electronic device 1000.

The display device 1060 may be coupled to other components via the buses or other communication links. As described above, the display device 1060 may include a display panel that includes a plurality of pixel circuits, a display panel driving circuit that drives the display panel, a power management integrated circuit that supplies power to the display panel and the display panel driving circuit, an over-current protection circuit that turns off at least one selected from the display panel driving circuit and the power management integrated circuit when a short-circuit is detected in the display panel driving circuit, and a short-circuit detection circuit that detects whether a scan start signal transmission line is short-circuited in the display panel driving circuit and operates the over-current protection circuit when the scan start signal transmission line is short-circuited. In an exemplary embodiment, the short-circuit detection circuit may include a voltage comparison block and a short-circuit determination block. The voltage comparison block may receive a scan start signal from the scan start signal transmission line, may receive a reference voltage from a reference voltage source, and may output a comparison result by comparing the scan start signal with the reference voltage at a falling edge of a vertical start signal. The short-circuit determination block may determine whether the scan start signal transmission line is short-circuited based on the comparison result and may operate the over-current protection circuit by providing a short-circuit detection signal to the over-current protection circuit when the scan start signal transmission line is short-circuited. In another exemplary embodiment, the short-circuit detection circuit may include a current comparison block and a short-circuit determination block. The current comparison block may sense a transmission line current flowing through the scan start signal transmission line at a time point where a set (e.g., predetermined) time elapses from a rising edge of the vertical start signal and may output a comparison result by comparing the transmission line current with a reference current. The short-circuit determination block may determine whether the scan start signal transmission line is short-circuited based on the comparison result and may operate the over-current protection circuit by providing a short-circuit detection signal to the over-current protection circuit when the scan start signal transmission line is short-circuited. Thus, the display device 1060 may prevent (or reduce) serious product liability accidents due to malfunction of the display device 1060 from occurring by including the short-circuit detection circuit. Since the above operations are described above, redundant description thereof will not be repeated here.

The subject matter of the present disclosure may be applied to a display device and an electronic device including the display device. For example, the subject matter of the present disclosure may be applied to a cellular phone, a smart phone, a video phone, a smart pad, a smart watch, a tablet PC, a car navigation system, a television, a computer monitor, a laptop, a digital camera, an HMD device, etc.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

Spatially relative terms, such as "beneath," "below," "lower," "under," "above," "upper," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly.

It will be understood that when an element or layer is referred to as being "on," "connected to," or "coupled to" another element or layer, it can be directly on, connected to, or coupled to the other element or layer, or one or more intervening elements or layers may be present. In addition, it will also be understood that when an element or layer is referred to as being "between" two elements or layers, it can be the only element or layer between the two elements or layers, or one or more intervening elements or layers may also be present.

The terminology used herein is for the purpose of describing particular embodiments only and is not intended to be limiting of the present disclosure. As used herein, the singular forms "a" and "an" are intended to include the plural forms as well, unless the context clearly indicates otherwise. It will be further understood that the terms "comprises," "comprising," "includes," and "including," when used in this specification, specify the presence of the stated features, integers, acts, operations, elements, and/or components, but do not preclude the presence or addition of one or more other features, integers, acts, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list.

As used herein, the terms "substantially," "about," and similar terms are used as terms of approximation and not as terms of degree, and are intended to account for the inherent deviations in measured or calculated values that would be recognized by those of ordinary skill in the art. Further, the use of "may" when describing embodiments of the present disclosure refers to "one or more embodiments of the present disclosure." As used herein, the terms "use," "using," and "used" may be considered synonymous with the terms "utilize," "utilizing," and "utilized," respectively. Also, the term "exemplary" is intended to refer to an example or illustration.

Also, any numerical range recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein, and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein.

The electronic or electric devices and/or any other relevant devices or components according to embodiments of the present disclosure described herein may be implemented utilizing any suitable hardware, firmware (e.g. an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate. Further, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the exemplary embodiments of the present disclosure.

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

The foregoing is illustrative of exemplary embodiments and is not to be construed as limiting thereof. Although a few exemplary embodiments have been described, those skilled in the art will readily appreciate that many modifications are possible in the exemplary embodiments without materially departing from the novel features of the present disclosure. Accordingly, all such modifications are intended to be included within the scope of the present disclosure as defined in the appended claims, and equivalents thereof. Therefore, it is to be understood that the foregoing is illustrative of various exemplary embodiments and is not to be construed as limited to the specific exemplary embodiments disclosed, and that modifications to the disclosed exemplary embodiments, as well as other exemplary embodiments, are intended to be included within the scope of the appended claims, and equivalents thereof.

What is claimed is:

1. A short-circuit detection circuit, comprising:
a voltage comparison block configured to receive a scan start signal from a scan start signal transmission line, to receive a reference voltage from a reference voltage source, to receive a vertical start signal, and to output a comparison result by comparing the scan start signal with the reference voltage at a falling edge of the vertical start signal; and
a short-circuit determination block configured to determine whether the scan start signal transmission line is short-circuited based on the comparison result and to operate an over-current protection circuit by providing a short-circuit detection signal to the over-current protection circuit when the scan start signal transmission line is short-circuited.

2. The short-circuit detection circuit of claim 1, wherein the short-circuit determination block determines that the scan start signal transmission line is short-circuited with a first transmission line through which a low power voltage is transmitted when the comparison result indicates that the scan start signal is less than the reference voltage at the falling edge of the vertical start signal.

3. The short-circuit detection circuit of claim 2, wherein the short-circuit determination block determines that the scan start signal transmission line is not short-circuited with the first transmission line when the comparison result indicates that the scan start signal is not less than the reference voltage at the falling edge of the vertical start signal.

4. The short-circuit detection circuit of claim 1, wherein the short-circuit determination block determines that the scan start signal transmission line is short-circuited with a second transmission line through which a high power voltage is transmitted when the comparison result indicates that the scan start signal is greater than the reference voltage at the falling edge of the vertical start signal.

5. The short-circuit detection circuit of claim 4, wherein the short-circuit determination block determines that the scan start signal transmission line is not short-circuited with the second transmission line when the comparison result indicates that the scan start signal is not greater than the reference voltage at the falling edge of the vertical start signal.

6. The short-circuit detection circuit of claim 1, wherein the short-circuit determination block determines that the scan start signal transmission line is short-circuited with a first transmission line through which a low power voltage is transmitted when the comparison result indicates that the scan start signal is less than the reference voltage by more than a first voltage difference at the falling edge of the vertical start signal.

7. The short-circuit detection circuit of claim 6, wherein the short-circuit determination block determines that the scan start signal transmission line is not short-circuited with the first transmission line when the comparison result indicates that the scan start signal is not less than the reference voltage by more than the first voltage difference at the falling edge of the vertical start signal.

8. The short-circuit detection circuit of claim 1, wherein the short-circuit determination block determines that the scan start signal transmission line is short-circuited with a second transmission line through which a high power voltage is transmitted when the comparison result indicates that the scan start signal is greater than the reference voltage by more than a second voltage difference at the falling edge of the vertical start signal.

9. The short-circuit detection circuit of claim 8, wherein the short-circuit determination block determines that the scan start signal transmission line is not short-circuited with the second transmission line when the comparison result indicates that the scan start signal is not greater than the reference voltage by more than the second voltage difference at the falling edge of the vertical start signal.

10. A short-circuit detection circuit, comprising:
a current comparison block configured to receive a vertical start signal, and to sense a transmission line current flowing through a scan start signal transmission line through which a scan start signal is transmitted at a time point prior to a time point at which a falling edge of a vertical start signal occurs and where a set time elapses from a rising edge of the vertical start signal and to output a comparison result by comparing the transmission line current with a reference current; and a short-circuit determination block configured to determine whether the scan start signal transmission line is short-circuited based on the comparison result and to operate an over-current protection circuit by providing a short-circuit detection signal to the over-current protection circuit when the scan start signal transmission line is short-circuited.

11. The short-circuit detection circuit of claim 10, wherein the short-circuit determination block determines that the scan start signal transmission line is short-circuited with a first transmission line through which a low power voltage is transmitted or a second transmission line through which a high power voltage is transmitted when the comparison result indicates that a current difference between the transmission line current and the reference current is greater than a reference value.

12. The short-circuit detection circuit of claim 11, wherein the short-circuit determination block determines that the scan start signal transmission line is not short-circuited with the first transmission line or the second transmission line when the comparison result indicates that the current difference between the transmission line current and the reference current is less than the reference value.

13. A display device, comprising:
a display panel comprising a plurality of pixel circuits;
a display panel driving circuit configured to drive the display panel;
a power management integrated circuit configured to supply power to the display panel and the display panel driving circuit;
an over-current protection circuit configured to turn off at least one selected from the display panel driving circuit and the power management integrated circuit when a short-circuit is detected in the display panel driving circuit; and
a short-circuit detection circuit configured to receive a vertical start signal, to detect whether a scan start signal transmission line is short-circuited in the display panel driving circuit at a time within a time range corresponding to the vertical start signal, and to operate the over-current protection circuit when the scan start signal transmission line is short-circuited.

14. The display device of claim 13, wherein the display panel driving circuit stores a short-circuit occurrence record indicating that the scan start signal transmission line is short-circuited when the scan start signal transmission line is short-circuited.

15. The display device of claim 13, wherein at least one selected from the power management integrated circuit, the over-current protection circuit, and the short-circuit detection circuit is implemented internally to the display panel driving circuit.

16. The display device of claim 13, wherein the short-circuit detection circuit comprises:
a voltage comparison block configured to receive a scan start signal from the scan start signal transmission line, to receive a reference voltage from a reference voltage source, and to output a comparison result by comparing the scan start signal with the reference voltage at a falling edge of the vertical start signal; and
a short-circuit determination block configured to determine whether the scan start signal transmission line is short-circuited based on the comparison result and to operate the over-current protection circuit by providing a short-circuit detection signal to the over-current protection circuit when the scan start signal transmission line is short-circuited.

17. The display device of claim 16, wherein the short-circuit determination block determines that the scan start signal transmission line is short-circuited with a first transmission line through which a low power voltage is transmitted when the comparison result indicates that the scan start signal is less than the reference voltage at the falling edge of the vertical start signal, and
wherein the short-circuit determination block determines that the scan start signal transmission line is not short-circuited with the first transmission line when the comparison result indicates that the scan start signal is not less than the reference voltage at the falling edge of the vertical start signal.

18. The display device of claim 16, wherein the short-circuit determination block determines that the scan start signal transmission line is short-circuited with a second transmission line through which a high power voltage is transmitted when the comparison result indicates that the scan start signal is greater than the reference voltage at the falling edge of the vertical start signal, and
wherein the short-circuit determination block determines that the scan start signal transmission line is not short-circuited with the second transmission line when the comparison result indicates that the scan start signal is not greater than the reference voltage at the falling edge of the vertical start signal.

19. The display device of claim 13, wherein the short-circuit detection circuit comprises:
a current comparison block configured to sense a transmission line current flowing through the scan start signal transmission line at a time point where a set time elapses from a rising edge of the vertical start signal and to output a comparison result by comparing the transmission line current with a reference current; and
a short-circuit determination block configured to determine whether the scan start signal transmission line is short-circuited based on the comparison result and to operate the over-current protection circuit by providing a short-circuit detection signal to the over-current protection circuit when the scan start signal transmission line is short-circuited.

20. The display device of claim 19, wherein the short-circuit determination block determines that the scan start signal transmission line is short-circuited with a first transmission line through which a low power voltage is transmitted or a second transmission line through which a high power voltage is transmitted when the comparison result indicates that a current difference between the transmission line current and the reference current is greater than a reference value, and
wherein the short-circuit determination block determines that the scan start signal transmission line is not short-circuited with the first transmission line or the second transmission line when the comparison result indicates that the current difference between the transmission line current and the reference current is less than the reference value.

* * * * *